(12) United States Patent
Igawa et al.

(10) Patent No.: US 6,936,186 B2
(45) Date of Patent: Aug. 30, 2005

(54) MESOMORPHIC COMPOUND, POLYMERIC MESOMORPHIC COMPOUND, AND ELECTROLYTE AND SECONDARY BATTERY INCLUDING SAME

(75) Inventors: Satoshi Igawa, Fujisawa (JP); Shinichi Nakamura, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 09/908,699

(22) Filed: Jul. 20, 2001

(65) Prior Publication Data

US 2002/0047104 A1 Apr. 25, 2002

(30) Foreign Application Priority Data

Jul. 24, 2000 (JP) .................................. 2000-222857
Jul. 3, 2001 (JP) .................................. 2001-202302

(51) Int. Cl.$^7$ .......................... C09K 19/52; H01M 6/04
(52) U.S. Cl. .......................... 252/299.01; 252/299.67; 429/188; 429/321
(58) Field of Search .................... 252/299.01, 299.6, 252/299.61, 299.62, 299.63, 299.64, 299.65, 299.66, 299.67; 429/188, 321

(56) References Cited

U.S. PATENT DOCUMENTS

| 5,482,650 A | | 1/1996 | Janulis et al. ........... 252/299.01 |
| 5,654,471 A | * | 8/1997 | Zahn et al. ................. 560/109 |
| 5,833,880 A | * | 11/1998 | Siemensmeyer et al. ..................... 252/299.64 |
| 6,692,658 B2 | * | 2/2004 | Nakamura et al. ..... 252/299.65 |
| 2002/0017632 A1 | | 2/2002 | Nakamura et al. ....... 252/299.2 |

FOREIGN PATENT DOCUMENTS

| DE | 197 16 822 A1 | 10/1998 | |
| EP | 0 350 935 A1 | 1/1990 | |
| EP | 0 640 676 A1 | 3/1995 | |
| EP | 0 641 850 A1 | 3/1995 | |
| EP | 0 675 186 B1 | * 3/1995 | ........... C09K/19/20 |
| JP | 10-112333 | 4/1998 | |
| JP | 11-86629 | 3/1999 | |
| WO | WO 99/12879 | 3/1999 | |

OTHER PUBLICATIONS

D. E. Fenton, et al., "Complexes of alkali metal ions with poly(ethylene oxide)", Letters, Polymer, vol. 14, Nov. 1973, p. 589.

M. B. Armand, et al., "Poly-ethers as Solid Electrolytes", Fast Ion Transport in Solids, Eds. Vashishta et al., Elsevier North Holland, Inc., 1979, pp. 131–136.

Polymer Preprints, Japan, vol. 40, No. 10, 1991, pp. 3766–3768.

T. Ohtake, et al., "Ion Conductive Liquid Crystals: Preparation and Properties of Complexes of Mesogenic Twin Oligomers with Lithium Salts", Preprint for Discussion of Liquid Society of Japan, 1998, pp. 432–433.

M. Ozaki, et al., "Fast Optical Switching in Polymer Waveguide Using Ferroelectric Liquid Crystal", Japan. J. Appl. Phys., vol. 29, No. 5, pp. L843–L845 (1990).

M. Ozaki, et al., "Static and Dynamic Properties of Optical Second Harmonic Generation in Ferroelectric Liquid Crystal", Ferroelectrics, vol. 121, pp. 259–274 (1991).

K. Ito, et al., "Effect of Terminal Groups on the Ionic Conductivity of a a,ω–Dicharged Poly(Ethylene Oxide) Oligomers", Solid State Ionics, vols. 86–88, pp. 325–328 (1996).

M. Watanabe, et al., "Estimation of LI$^+$ Transport Number in Polymer Eelctrolytes by the Combination of Complex Impedance and Potentiostatic Polarization Measurements", Solid State Ionics, vols. 28–30, pp. 911–917 (1988).

K. Ito, et al., "Polyether/Salt Hybrid (IV). Effect of Benzenesulfonate Group(s) and PEO Molecular Weight on the Bulk Ionic Conductivity", Electrochimica Acta, vol. 42, No. 10, pp. 1561–1570 (1997).

M. Lee, et al., "Liquid–Crystalline Rod–Coil Polymers Based on Poly(Ethylene Oxide)s and the Influence of the Complexation of LiCF$_3$SO$_3$ on the Liquid–Crystalline Assembly", J. Mater. Chem., vol. 6, No. 7, pp. 1079–1086 (1996).

* cited by examiner

*Primary Examiner*—Mark F. Huff
*Assistant Examiner*—Jennifer R. Sadula
(74) *Attorney, Agent, or Firm*—Fitzpatrick, Cella, Harper & Scinto (57) ABSTRACT

A mesomorphic compound having an ionic conductivity is used as an electrolyte for a secondary battery, etc. The mesomorphic compound has a partial structure which includes (a) a mesomorphic mesogen group and (b) two divalent groups. Each of the two divalent groups is directly connected to the mesogen group, and each of the two divalent groups is represented by the following formula: $(OCH_2CH_2)_x$ or $(OCH_2CH(CH_3))_y$, in which x and y are respectively an integer of 3 to 25. The mesomorphic compound may be a polymeric mesomorphic compound.

11 Claims, 1 Drawing Sheet

MESOMORPHIC COMPOUND, POLYMERIC MESOMORPHIC COMPOUND, AND ELECTROLYTE AND SECONDARY BATTERY INCLUDING SAME

FIELD OF THE INVENTION AND RELATED ART

The present invention relates to a mesomorphic compound, a polymeric mesomorphic compound, and an electrolyte and secondary battery including the (polymeric) mesomorphic compound. Particularly, the present invention relates to a mesomorphic compound or polymeric mesomorphic compound useful as a smectic liquid crystal material; an electrolyte for use in battery, sensor device, etc., in the field of electronics; and a secondary battery using the electrolyte.

A smectic liquid crystal has generally been utilized as a liquid crystal material for a liquid crystal display device. In addition thereto, based on its function, the smectic liquid crystal has also been studied on application to various fields, such as a light-switching device (as described in M. Ozaki, et al., "Jpn. J. Appl. Phy.", vol. 23, pp. L843-(1990)) and a non-linear optical device (as described M. Ozaki et al., "Ferroelectrics", vol. 121, pp. 259-(1991)). Based on these studies, various smectic liquid crystal compounds (mesomorphic compounds) have been synthesized.

Incidentally, with respect to polyethylene oxide (PEO), Wright et al. have reported in 1973 an ion conductive characteristic of a complex of PEO with an alkali metal salt and Armand et al. have suggested in 1979 the possibility of use of the complex as an electrolyte for a battery. As a result, extensive research and development as to an organic solid (-state) electrolyte have been widely made in the world. The solid electrolyte is not in the liquid state, thus being free from leakage thereof to the outside. Further, the solid electrolyte has the advantages of heat-resistance, reliability, safety properties, and size-reduction in a resultant device, when compared with the liquid electrolyte. Further, the organic electrolyte is softer than the inorganic electrolyte, thus being readily shaped or processed advantageously.

Generally, an ionic conductivity of the electrolyte may be represented by a product of carrier density, (electric) charge, and ionic mobility. Accordingly, the electrolyte is required to have a higher polarity for dissociating ions and a lower viscosity for moving the dissociated ions. In view of these properties, the above-mentioned PEO is insufficient to provide the resultant solid electrolyte with such properties. As described above, the ion-transporting mechanism of PEO is based on the successive ligand exchange of dissociated ions, based on coordination to a donating polar group, by thermal segment movement of its polymer chain, thus being liable to be largely affected by a change in temperature. In order to increase carrier density, when a large amount of metal ion is incorporated in the PEO-based solid electrolyte, crystallization is liable to occur in the system, thus adversely lower the ionic mobility. In order to prevent such a crystallization, derivatives or modified products of PEO insulating one crosslinked with an urethane component (M. Watanabe et al. "Solid State Ionics", 28–30 (1998), 911-), one having a side chain introduced into a crosslinked potion for improving the ionic mobility at low temperature ("Polymer Preprints, Japan", vol. 40, No. 10, 3766 (1991)) and one of fused-salt type having a terminal portion into which a salt is incorporated (K. Ito et al., "Solid State Ionics", 86–88 (1996), 325–328 and K. Ito et al., "Electrochim. Acta", vol. 42, pp. 1561–1570, (1997)) have been developed.

Such modified PEOs, however, have failed to provide a sufficient ionic conductivity as yet. For this reason, an electrolytic solution comprising a mixture of a high-permitivity organic solvent and a low-viscosity solvent or a gel-type electrolyte wherein an electrolytic solution is solidified by an organic polymeric compound is predominantly used. Further, in the case of utilizing the solid electrolyte for a battery device, the solid electrolyte is required to improve not only the ion-transporting efficiency but also an efficiency of electrochemical reaction at a boundary with an electrode.

The liquid crystal using channels based on orientation or alignment of liquid crystal molecules has been proposed, e.g., in Japanese Laid-Open Patent Application (JP-A) 11-86629. The liquid crystal used, however, has one polyethylene oxide (PEO) side chain, thus being different from a mesomorphic compound according to the present invention described hereinbelow.

Further, as a smectic liquid crystal material for use in an electrolyte, a mesomorphic compound having a skeleton structure comprising a mesogen group and one ethylene oxide-side chain connected to the mesogen group ("J. Mater. Chem", 1079–1086, 6(7) (1996)) and a dimer liquid crystal comprising an ethylene oxide chain and two mesogen groups connected to the ethylene oxide on opposite sides of the ethylene oxide ("Preprint for Discussion of Liquid Crystal Society of Japan (in Japanese)", 432 (1998)) have been proposed. However, the former (mesomorphic compound) has a narrower temperature range of smectic (liquid crystal) phase. The latter (dimer liquid crystal) has a molecular structure such that both terminals of the ethylene oxide chain are connected with the melsogen groups, thus resulting in a narrower latitude in ethylene oxide chain. As a result, a sufficient ion conductivity has not been attained as yet. Further, addition of a smectic liquid crystal compound in an electrolyte has been proposed in order to suppress an occurrence of dendrite at a lithium negative electrode (Japanese Laid-Open Patent Application (JP-A) 10-112333). The smectic liquid crystal compound is different in structure from the mesomorphic compound of the present invention.

SUMMARY OF THE INVENTION

In view of the above-mentioned problems, an object of the present invention is to provide a mesomorphic compound useful for a smectic liquid crystal material.

Another object of the present invention is to provide an electrolyte and secondary battery using the mesomorphic compound having a higher ion conductivity.

According to the present invention, there is provided a mesomorphic compound having a partial structure comprising a mesomorphic mesogen group and two divalent groups each connected to the mesogen group, each divalent group being represented by the following formula:

$(OCH_2CH_2)_x$ or $(OCH_2CH(CH_3))_y$, wherein x and y are respectively an integer of 3–25. The mesomorphic compound may be a polymeric mesomorphic compound obtained through polymerization of a monomer having such a partial structure. In this case, the partial structure has at least one polymerizable group.

According to the present invention, there is also provided an electrolyte comprising the above-mentioned mesomorphic compound (or polymeric mesomorphic compound) and a metal salt.

According to the present invention, there is further provided a secondary battery comprising the above-mentioned electrolyte and an electrode.

Herein, the term "(polymeric) mesomorphic compound" refers to a compound assuming a mesomorphic (liquid crystal) phase or a latent mesomorphic phase. The latent mesomorphic phase refers to a property of a compound concerned that the compound alone does not exhibit a mesomorphic phase but can be a component compatibly contained in a mesomorphic phase of a liquid crystal composition or mixture.

These and other objects, features and advantages of the present invention will become more apparent upon a consideration of the following description of the preferred embodiments of the present invention taken in conjunction with the accompanying drawing.

DETAILED DESCRIPTION OF THE PREFERRED EMBODIMENTS

The mesomorphic compound according to the present invention is characterized by having two specific ethylene oxide (or propylene oxide)-side chains between which a mesomorphic mesogen group is disposed, as described above.

The mesomorphic compound of the present invention may preferably have a structure represented by the following formula (1):

$$R_1\text{-}X_m\text{-}A\text{-}Y_n\text{-}R_2 \quad (1),$$

wherein

A denotes a mesomorphic mesogen group represented by the formula:

in which A1, A2 and A3 independently denote 1,4-phenylene optionally having at least one CH replaced by CF or N, or 1,4-cyclohexylene; A4, A5 and A6 independently denote a single bond, 1,4-phenylene optionally having at least one CH replaced by CF or N, or 1,4-cyclohexylene; and B1, B2, B3, B4 and B5 independently denote a single bond, —CH$_2$O—, —OCH$_2$—, —COO— or —OOC—;

X denotes —CH$_2$CH$_2$O— or —CH(CH$_3$)CH$_2$O—;

Y denotes —OCH$_2$CH$_2$— or —OCH$_2$CH(CH$_3$)—;

R1 and R2 independently denote a linear or branched alkyl group having 1–100 carbon atoms optionally having at least one —CH$_2$— replaced by —O—, —CO—, —S—, —CH=CH—, —C(CH$_3$)=CH—, —CH=C(CH$_3$)—, —C≡C— or epoxy group and optionally having at least one hydrogen atom replaced by fluorine atom; and m and n independently denote an integer of 3–25, preferably 3–15. When m and n are 3–15, the resultant mesomorphic compound is liable to exhibit a wider liquid crystal phase temperature. The mesomorphic compound of the formula (1) may be an optically active compound.

Further, the mesomorphic mesogen group A in the formula (1) may preferably be represented by any one of the following formulas (1a) to (1j):

(1a)

(1b)

(1c)

(1d)

(1e)

wherein Z independently denote an integer of 0–4.

In the present invention, the mesomorphic compound may preferably exhibit smectic phase.

The polymeric mesomorphic compound comprises a polymer obtained through polymerization of a monomer. The monomer a partial structure comprising a mesomorphic mesogen group and two divalent groups each connected to the mesogen group and each divalent group is represented by the following formula:

$$(OCH_2CH_2)_x \text{ or } (OCH_2CH(CH_3))_y,$$

wherein x and y are respectively an integer of 3–25.

The monomer may preferably be represented by the following formula (1'):

$$R_1\text{-}X_m\text{-}A\text{-}Y_n\text{-}R_2 \qquad (1'),$$

wherein

A denotes a mesomorphic mesogen group represented by the formula:

$$A1\text{-}B1\text{-}A2\text{-}B2\text{-}A3\text{-}B3\text{-}A4\text{-}B4\text{-}A5\text{-}B5\text{-}A6,$$

in which A1, A2 and A3 independently denote 1,4-phenylene optionally having at least one CH replaced by CF or N, or 1,4-cyclohexylene; A4, A5 and A6 independently denote a single bond, 1,4-phenylene optionally having at least one CH replaced by CF or N, or 1,4-cyclohexylene; and B1, B2, B3, B4 and B5 independently denote a single bond, —CH$_2$O—, —OCH$_2$—, —COO— or —OOC—;

X denotes —CH$_2$CH$_2$O— or —CH(CH$_3$)CH$_2$O—;

Y denotes —OCH$_2$CH$_2$— or —OCH$_2$CH(CH$_3$)—;

R1 and R2 independently denote a linear or branched alkyl group having 1–100 carbon atoms, preferably 1–25, optionally having at least one —CH$_2$— replaced by —O—, —CO—, —S—, —CH=CH—, —C(CH$_3$)=CH—, —CH=C(CH$_3$)—, —C(CH$_3$)=CH—, —CH=C(CH$_3$)—, —C≡C— or epoxy group and optionally having at least one hydrogen atom replaced by fluorine atom, at least one of R1 and R2 being a polymerizable group; and m and n independently denote an integer of 3–25, preferably 3–15. When m and n are 3–15, the resultant polymeric mesomorphic compound is liable to show a wider liquid crystal phase temperature. The polymeric mesomorphic compound may be an optically active compound.

The polymerizable group for R1 and/or R2 may comprise unsaturated bond or epoxy group, and the polymerization may generally performed by heating or light irradiation. Further, the polymer may preferably be represented by any one of the following formulas (2') to (4'):

$$R11\text{-}X_m\text{-}A\text{-}Y_n\text{-}R2 \qquad (2')$$

$$R1\text{-}X_m\text{-}A\text{-}Y_n\text{-}R12 \qquad (3')$$

$$R11\text{-}X_m\text{-}A\text{-}Y_n\text{-}R12 \qquad (4')$$

wherein

A, X, Y, R1, R2, m and n have the same meanings as defined in the above-mentioned formula (1');

R11 and R12 denote the following groups, respectively:

-continued in which s and t independently denote an integer of 2–10000, preferably 2–1000; R3 and R4 independently denote a linear or branched alkylene group having 1–100 carbon atoms optionally having at least one —$CH_2$— replaced by —O—; —CO— or —S— and optionally having at least one hydrogen atom replaced by fluorine atom;

The polymeric mesomorphic compound may preferably have a polymerization degree (the number of each recurring unit) of 2–10000, more preferably 2–1000 and may preferably assume a smectic phase.

When the monomer for the polymeric mesomorphic compound is polymerized, the monomer may appropriately be blended with other monomers to effect copolymerization so as to control a liquid crystal phase, a phase transition temperature and a polymerization degree.

In the electrolyte of the present invention comprising a mixture of the mesomorphic compound (preferably having the formula (1)) or the polymeric mesomorphic compound (preferably having the formulas (2') to (4')) with the metal salt, the metal salt may preferably be an alkali metal salt, such as $MClO_4$, $MBF_4$, $MPF_6$, $MCF_3SO_3$ (M=Li, Na or K) and $Li(CF_3SO_2)_2N$, but may be other metal salts, such as $CuSO_4$, $Ni(NO_3)_2$, and $Ni(BF_4)_2$. Of these metal salts, in the present invention, lithium salts, such as $LiClO_4$, $LiBF_4$, $LiPF_6$, $LiCF_3SO_3$ and $Li(CF_3SO_2)_2N$ may particularly be preferred.

These metal salts may desirably be contained in the electrolyte in an amount of 0.01–50 wt. %, preferably 0.1–30 wt. %.

The electrolyte of the present invention may further comprise an organic solvent, preferably a polar organic solvent, such as ethylene carbonate, propylene carbonate, γ-butyrolactone, tetrahydrofuran, dioxane, methyl ethyl ketone, methyl propionate, dimethoxyethane and glycols.

The electrolyte of the present invention may preferably have a mesomorphic phase (or a liquid crystal phase), particularly a smectic phase.

The mesomorphic compound represented by the above-mentioned formula (1) used in the present invention may be formulated as a liquid crystal composition (mixture) by blending it with at least one species of another mesomorphic compound and/or at least one species of a non-mesomorphic compound in an appropriate mixing ratio, thus controlling species of the resultant liquid crystal phase and a liquid crystal phase transition temperature.

The electrolyte of the present invention exhibits an ion conductivity anisotropy. This may be attributable to a regularly oriented or aligned molecular structure of the (polymeric) mesomorphic compound formed by the mesomorphic mesogen group comprising, e.g., phenylene group having a smaller ion conductivity and two ethylene (or propylene) oxide chains having a larger ion conductivity, due to a mesomorphism of the mesomorphic compound or the monomer for the polymeric mesomorphic compound. More specifically, when ions are moved in a direction parallel to molecular layer extension direction along the substrate surface (i.e., Y direction shown in FIG. 2), ethylene (or propylene) oxide chains of adjacent two molecules are orderly oriented with a spacing therebetween (but are close to each other) to allow a larger ion conductivity. When ions are moved in a direction perpendicular to a molecular layer extension direction along the substrate surface (i.e., X (or rubbing) direction shown in FIG. 2), liquid crystal molecules are aligned in a longitudinal direction, so that ions are required to jump over the mesogen groups to ensure ionic conduction. In order to allow ions to jump over the mesogen groups, there is a larger potential barrier, thus resulting in a smaller liquid crystal. For this reason, the electrolyte of the present invention has different ion conductivities between X and Y directions (FIG. 2) to exhibit an ion conductivity anisotropy.

Specific examples of the above-mentioned mesomorphic compound of the formula (1) may include those shown in Tables 1–11 (Example Compounds Nos. 1 to 153) below, but the mesomorphic compound of the present invention is not restricted to these compounds.

In the tables, mesogen groups 2a to 3b as the group A are represented by the following structures, respectively.

(2a)

(2b)

-continued

| | | TABLE 1 | | | | | | | | TABLE 1-continued | | | | |
|---|---|---|---|---|---|---|---|---|---|---|---|---|---|---|
| | | $R_1-X_m-A-Y_n-R_2$ | | | | | | | | $R_1-X_m-A-Y_n-R_2$ | | | | |
| No. | A | $R_1$ | $R_2$ | X | Y | m | n | No. | A | $R_1$ | $R_2$ | X | Y | m | n |
| 1 | 2a | $CH_3O$ | $OCH_3$ | $CH_2CH_2O$ | $OCH_2CH_2$ | 3 | 3 | 6 | 2a | $CH_3O$ | $OCH_3$ | $CH_2CH_2O$ | $OCH_2CH_2$ | 3 | 8 |
| 2 | 2a | $CH_3O$ | $OCH_3$ | $CH_2CH_2O$ | $OCH_2CH_2$ | 3 | 4 | 7 | 2a | $CH_3O$ | $OCH_3$ | $CH_2CH_2O$ | $OCH_2CH_2$ | 3 | 10 |
| 3 | 2a | $CH_3O$ | $OCH_3$ | $CH_2CH_2O$ | $OCH_2CH_2$ | 3 | 5 | 8 | 2a | $CH_3O$ | $OCH_3$ | $CH_2CH_2O$ | $OCH_2CH_2$ | 3 | 16 |
| 4 | 2a | $CH_3O$ | $OCH_3$ | $CH_2CH_2O$ | $OCH_2CH_2$ | 3 | 6 | 9 | 2a | $CH_3O$ | $OCH_3$ | $CH_2CH_2O$ | $OCH_2CH_2$ | 3 | 22 |
| 5 | 2a | $CH_3O$ | $OCH_3$ | $CH_2CH_2O$ | $OCH_2CH_2$ | 3 | 7 | 10 | 2a | $CH_3O$ | $OCH_3$ | $CH_2CH_2O$ | $OCH_2CH_2$ | 4 | 3 |

TABLE 1-continued $R_1$—Xm—A—Yn—$R_2$

| No. | A | $R_1$ | $R_2$ | X | Y | m | n |
|---|---|---|---|---|---|---|---|
| 11 | 2a | $CH_3O$ | $OCH_3$ | $CH_2CH_2O$ | $OCH_2CH_2$ | 4 | 4 |
| 12 | 2a | $CH_3O$ | $OCH_3$ | $CH_2CH_2O$ | $OCH_2CH_2$ | 4 | 5 |
| 13 | 2a | $CH_3O$ | $OCH_3$ | $CH_2CH_2O$ | $OCH_2CH_2$ | 4 | 6 |
| 14 | 2a | $CH_3O$ | $OCH_3$ | $CH_2CH_2O$ | $OCH_2CH_2$ | 4 | 7 |
| 15 | 2a | $CH_3O$ | $OCH_3$ | $CH_2CH_2O$ | $OCH_2CH_2$ | 4 | 8 |

TABLE 2

$R_1$—Xm—A—Yn—$R_2$

| No. | A | $R_1$ | $R_2$ | X | Y | m | n |
|---|---|---|---|---|---|---|---|
| 16 | 2a | $CH_3O$ | $OCH_3$ | $CH_2CH_2O$ | $OCH_2CH_2$ | 4 | 11 |
| 17 | 2a | $CH_3O$ | $OCH_3$ | $CH_2CH_2O$ | $OCH_2CH_2$ | 4 | 17 |
| 18 | 2a | $CH_3O$ | $OCH_3$ | $CH_2CH_2O$ | $OCH_2CH_2$ | 4 | 23 |
| 19 | 2a | $CH_3O$ | $OCH_3$ | $CH_2CH_2O$ | $OCH_2CH_2$ | 5 | 3 |
| 20 | 2a | $CH_3O$ | $OCH_3$ | $CH_2CH_2O$ | $OCH_2CH_2$ | 5 | 4 |
| 21 | 2a | $CH_3O$ | $OCH_3$ | $CH_2CH_2O$ | $OCH_2CH_2$ | 5 | 5 |
| 22 | 2a | $CH_3O$ | $OCH_3$ | $CH_2CH_2O$ | $OCH_2CH_2$ | 5 | 6 |
| 23 | 2a | $CH_3O$ | $OCH_3$ | $CH_2CH_2O$ | $OCH_2CH_2$ | 5 | 7 |
| 24 | 2a | $CH_3O$ | $OCH_3$ | $CH_2CH_2O$ | $OCH_2CH_2$ | 5 | 8 |
| 25 | 2a | $CH_3O$ | $OCH_3$ | $CH_2CH_2O$ | $OCH_2CH_2$ | 5 | 12 |
| 26 | 2a | $CH_3O$ | $OCH_3$ | $CH_2CH_2O$ | $OCH_2CH_2$ | 5 | 18 |
| 27 | 2a | $CH_3O$ | $OCH_3$ | $CH_2CH_2O$ | $OCH_2CH_2$ | 5 | 24 |
| 28 | 2a | $CH_3O$ | $OCH_3$ | $CH_2CH_2O$ | $OCH_2CH_2$ | 6 | 3 |
| 29 | 2a | $CH_3O$ | $OCH_3$ | $CH_2CH_2O$ | $OCH_2CH_2$ | 6 | 4 |
| 30 | 2a | $CH_3O$ | $OCH_3$ | $CH_2CH_2O$ | $OCH_2CH_2$ | 6 | 5 |

TABLE 3

$R_1$—Xm—A—Yn—$R_2$

| No. | A | $R_1$ | $R_2$ | X | Y | m | n |
|---|---|---|---|---|---|---|---|
| 31 | 2a | $CH_3O$ | $OCH_3$ | $CH_2CH_2O$ | $OCH_2CH_2$ | 6 | 6 |
| 32 | 2a | $CH_3O$ | $OCH_3$ | $CH_2CH_2O$ | $OCH_2CH_2$ | 6 | 7 |
| 33 | 2a | $CH_3O$ | $OCH_3$ | $CH_2CH_2O$ | $OCH_2CH_2$ | 6 | 8 |
| 34 | 2a | $CH_3O$ | $OCH_3$ | $CH_2CH_2O$ | $OCH_2CH_2$ | 6 | 13 |
| 35 | 2a | $CH_3O$ | $OCH_3$ | $CH_2CH_2O$ | $OCH_2CH_2$ | 6 | 19 |
| 36 | 2a | $CH_3O$ | $OCH_3$ | $CH_2CH_2O$ | $OCH_2CH_2$ | 6 | 25 |
| 37 | 2a | $CH_3O$ | $OCH_3$ | $CH_2CH_2O$ | $OCH_2CH_2$ | 7 | 3 |
| 38 | 2a | $CH_3O$ | $OCH_3$ | $CH_2CH_2O$ | $OCH_2CH_2$ | 7 | 4 |
| 39 | 2a | $CH_3O$ | $OCH_3$ | $CH_2CH_2O$ | $OCH_2CH_2$ | 7 | 5 |
| 40 | 2a | $CH_3O$ | $OCH_3$ | $CH_2CH_2O$ | $OCH_2CH_2$ | 7 | 6 |
| 41 | 2a | $CH_3O$ | $OCH_3$ | $CH_2CH_2O$ | $OCH_2CH_2$ | 7 | 7 |
| 42 | 2a | $CH_3O$ | $OCH_3$ | $CH_2CH_2O$ | $OCH_2CH_2$ | 7 | 8 |
| 43 | 2a | $CH_3O$ | $OCH_3$ | $CH_2CH_2O$ | $OCH_2CH_2$ | 7 | 14 |
| 44 | 2a | $CH_3O$ | $OCH_3$ | $CH_2CH_2O$ | $OCH_2CH_2$ | 7 | 20 |
| 45 | 2a | $CH_3O$ | $OCH_3$ | $CH_2CH_2O$ | $OCH_2CH_2$ | 8 | 3 |

TABLE 4

$R_1$—Xm—A—Yn—$R_2$

| No. | A | $R_1$ | $R_2$ | X | Y | m | n |
|---|---|---|---|---|---|---|---|
| 46 | 2a | $CH_3O$ | $OCH_3$ | $CH_2CH_2O$ | $OCH_2CH_2$ | 8 | 4 |
| 47 | 2a | $CH_3O$ | $OCH_3$ | $CH_2CH_2O$ | $OCH_2CH_2$ | 8 | 5 |
| 48 | 2a | $CH_3O$ | $OCH_3$ | $CH_2CH_2O$ | $OCH_2CH_2$ | 8 | 6 |
| 49 | 2a | $CH_3O$ | $OCH_3$ | $CH_2CH_2O$ | $OCH_2CH_2$ | 8 | 7 |
| 50 | 2a | $CH_3O$ | $OCH_3$ | $CH_2CH_2O$ | $OCH_2CH_2$ | 8 | 8 |
| 51 | 2a | $CH_3O$ | $OCH_3$ | $CH_2CH_2O$ | $OCH_2CH_2$ | 8 | 9 |
| 52 | 2a | $CH_3O$ | $OCH_3$ | $CH_2CH_2O$ | $OCH_2CH_2$ | 8 | 15 |
| 53 | 2a | $CH_3O$ | $OCH_3$ | $CH_2CH_2O$ | $OCH_2CH_2$ | 8 | 21 |
| 54 | 2a | $CH_3O$ | $OCH_3$ | $CH_2CH_2O$ | $OCH_2CH_2$ | 9 | 9 |
| 55 | 2a | $CH_3O$ | $OCH_3$ | $CH_2CH_2O$ | $OCH_2CH_2$ | 10 | 10 |
| 56 | 2a | $CH_3O$ | $OCH_3$ | $CH_2CH_2O$ | $OCH_2CH_2$ | 11 | 11 |
| 57 | 2a | $CH_3O$ | $OCH_3$ | $CH_2CH_2O$ | $OCH_2CH_2$ | 12 | 12 |

TABLE 4-continued $R_1$—Xm—A—Yn—$R_2$

| No. | A | $R_1$ | $R_2$ | X | Y | m | n |
|---|---|---|---|---|---|---|---|
| 58 | 2a | $CH_3O$ | $OCH_3$ | $CH_2CH_2O$ | $OCH_2CH_2$ | 13 | 13 |
| 59 | 2a | $CH_3O$ | $OCH_3$ | $CH_2CH_2O$ | $OCH_2CH_2$ | 14 | 14 |
| 60 | 2a | $CH_3O$ | $OCH_3$ | $CH_2CH_2O$ | $OCH_2CH_2$ | 15 | 15 |

TABLE 5

$R_1$—Xm—A—Yn—$R_2$

| No. | A | $R_1$ | $R_2$ | X | Y | m | n |
|---|---|---|---|---|---|---|---|
| 61 | 2a | $CH_3O$ | $OCH_3$ | $CH_2CH_2O$ | $OCH_2CH_2$ | 16 | 16 |
| 62 | 2a | $CH_3O$ | $OCH_3$ | $CH_2CH_2O$ | $OCH_2CH_2$ | 17 | 17 |
| 63 | 2a | $CH_3O$ | $OCH_3$ | $CH_2CH_2O$ | $OCH_2CH_2$ | 18 | 18 |
| 64 | 2a | $CH_3O$ | $OCH_3$ | $CH_2CH_2O$ | $OCH_2CH_2$ | 19 | 19 |
| 65 | 2a | $CH_3O$ | $OCH_3$ | $CH_2CH_2O$ | $OCH_2CH_2$ | 20 | 20 |
| 66 | 2a | $CH_3O$ | $OCH_3$ | $CH_2CH_2O$ | $OCH_2CH_2$ | 21 | 21 |
| 67 | 2a | $CH_3O$ | $OCH_3$ | $CH_2CH_2O$ | $OCH_2CH_2$ | 22 | 22 |
| 68 | 2a | $CH_3O$ | $OCH_3$ | $CH_2CH_2O$ | $OCH_2CH_2$ | 23 | 23 |
| 69 | 2a | $CH_3O$ | $OCH_3$ | $CH_2CH_2O$ | $OCH_2CH_2$ | 24 | 24 |
| 70 | 2a | $CH_3O$ | $OCH_3$ | $CH_2CH_2O$ | $OCH_2CH_2$ | 25 | 25 |
| 71 | 2a | $CH_3O$ | $OC_2H_5$ | $CH_2CH_2O$ | $OCH_2CH_2$ | 3 | 3 |
| 72 | 2a | $C_2H_5O$ | $OCH_3$ | $CH_2CH_2O$ | $OCH_2CH_2$ | 3 | 3 |
| 73 | 2a | $C_2H_5O$ | $OC_2H_5$ | $CH_2CH_2O$ | $OCH_2CH_2$ | 3 | 3 |
| 74 | 2a | $CH_3O$ | $OC_3H_7$ | $CH_2CH_2O$ | $OCH_2CH_2$ | 3 | 3 |
| 75 | 2a | $C_3H_7O$ | $OCH_3$ | $CH_2CH_2O$ | $OCH_2CH_2$ | 3 | 3 |

TABLE 6

$R_1$—Xm—A—Yn—$R_2$

| No. | A | $R_1$ | $R_2$ | X | Y | m | n |
|---|---|---|---|---|---|---|---|
| 76 | 2a | $C_2H_5O$ | $OC_3H_7$ | $CH_2CH_2O$ | $OCH_2CH_2$ | 4 | 4 |
| 77 | 2a | $C_3H_7O$ | $OC_2H_5$ | $CH_2CH_2O$ | $OCH_2CH_2$ | 4 | 4 |
| 78 | 2a | $C_3H_7O$ | $OC_3H_7$ | $CH_2CH_2O$ | $OCH_2CH_2$ | 4 | 4 |
| 79 | 2a | $CH_3O$ | $OC_4H_9$ | $CH_2CH_2O$ | $OCH_2CH_2$ | 4 | 4 |
| 80 | 2a | $C_4H_9O$ | $OCH_3$ | $CH_2CH_2O$ | $OCH_2CH_2$ | 4 | 4 |
| 81 | 2a | $C_2H_5O$ | $OC_4H_9$ | $CH_2CH_2O$ | $OCH_2CH_2$ | 5 | 5 |
| 82 | 2a | $C_4H_9O$ | $OC_2H_5$ | $CH_2CH_2O$ | $OCH_2CH_2$ | 5 | 5 |
| 83 | 2a | $C_3H_7O$ | $OC_4H_9$ | $CH_2CH_2O$ | $OCH_2CH_2$ | 5 | 5 |
| 84 | 2a | $C_4H_9O$ | $OC_3H_7$ | $CH_2CH_2O$ | $OCH_2CH_2$ | 5 | 5 |
| 85 | 2a | $C_4H_9O$ | $OC_4H_9$ | $CH_2CH_2O$ | $OCH_2CH_2$ | 5 | 5 |
| 86 | 2a | $CH_3O$ | $OC_5H_{11}$ | $CH_2CH_2O$ | $OCH_2CH_2$ | 6 | 6 |
| 87 | 2a | $C_5H_{11}O$ | $OCH_3$ | $CH_2CH_2O$ | $OCH_2CH_2$ | 6 | 6 |
| 88 | 2a | $C_2H_5O$ | $OC_5H_{11}$ | $CH_2CH_2O$ | $OCH_2CH_2$ | 6 | 6 |
| 89 | 2a | $C_5H_{11}O$ | $OC_2H_5$ | $CH_2CH_2O$ | $OCH_2CH_2$ | 7 | 7 |
| 90 | 2a | $C_3H_7O$ | $OC_5H_{11}$ | $CH_2CH_2O$ | $OCH_2CH_2$ | 7 | 7 |

TABLE 7

$R_1$—Xm—A—Yn—$R_2$

| No. | A | $R_1$ | $R_2$ | X | Y | m | n |
|---|---|---|---|---|---|---|---|
| 91 | 2a | $C_5H_{11}O$ | $OC_3H_7$ | $CH_2CH_2O$ | $OCH_2CH_2$ | 7 | 7 |
| 92 | 2a | $C_4H_9O$ | $OC_5H_{11}$ | $CH_2CH_2O$ | $OCH_2CH_2$ | 8 | 8 |
| 93 | 2a | $C_5H_{11}O$ | $OC_4H_9$ | $CH_2CH_2O$ | $OCH_2CH_2$ | 8 | 8 |
| 94 | 2a | $C_5H_{11}O$ | $OC_5H_{11}$ | $CH_2CH_2O$ | $OCH_2CH_2$ | 8 | 8 |
| 95 | 2a | $C_6H_{13}O$ | $OC_6H_{13}$ | $CH_2CH_2O$ | $OCH_2CH_2$ | 3 | 3 |
| 96 | 2a | $C_7H_{15}O$ | $OC_7H_{15}$ | $CH_2CH_2O$ | $OCH_2CH_2$ | 4 | 4 |
| 97 | 2a | $C_8H_{17}O$ | $OC_8H_{17}$ | $CH_2CH_2O$ | $OCH_2CH_2$ | 5 | 5 |
| 98 | 2a | $C_9H_{19}O$ | $OC_9H_{19}$ | $CH_2CH_2O$ | $OCH_2CH_2$ | 6 | 6 |
| 99 | 2a | $C_{10}H_{21}O$ | $OC_{10}H_{21}$ | $CH_2CH_2O$ | $OCH_2CH_2$ | 7 | 7 |
| 100 | 2a | $C_{11}H_{23}O$ | $OC_{11}H_{23}$ | $CH_2CH_2O$ | $OCH_2CH_2$ | 8 | 8 |
| 101 | 2a | $C_{12}H_{25}O$ | $OC_{12}H_{25}$ | $CH_2CH_2O$ | $OCH_2CH_2$ | 3 | 3 |
| 102 | 2a | $C_{15}H_{31}O$ | $OC_{15}H_{31}$ | $CH_2CH_2O$ | $OCH_2CH_2$ | 4 | 4 |
| 103 | 2a | $C_{24}H_{49}O$ | $OC_{24}H_{49}$ | $CH_2CH_2O$ | $OCH_2CH_2$ | 5 | 5 |
| 104 | 2a | $C_{30}H_{61}O$ | $OC_{30}H_{61}$ | $CH_2CH_2O$ | $OCH_2CH_2$ | 6 | 6 |
| 105 | 2a | $C_{45}H_{91}O$ | $OC_{45}H_{91}$ | $CH_2CH_2O$ | $OCH_2CH_2$ | 7 | 7 |

TABLE 8

$R_1-Xm-A-Yn-R_2$

| No. | A | $R_1$ | $R_2$ | X | Y | m | n |
|---|---|---|---|---|---|---|---|
| 106 | 2a | $C_{70}H_{141}O$ | $OC_{70}H_{141}$ | $CH_2CH_2O$ | $OCH_2CH_2$ | 8 | 8 |
| 107 | 2a | $C_{90}H_{181}O$ | $OC_{90}H_{181}$ | $CH_2CH_2O$ | $OCH_2CH_2$ | 3 | 3 |
| 108 | 2a | $C_{99}H_{199}O$ | $OC_{100}H_{201}$ | $CH_2CH_2O$ | $OCH_2CH_2$ | 4 | 4 |
| 109 | 2a | $CH_3O$ | $OCH_3$ | $CH(CH_3)CH_2O$ | $OCH_2CH(CH_3)$ | 3 | 3 |
| 110 | 2a | $CH_3O$ | $OCH_3$ | $CH_2CH_2O$ | $OCH_2CH(CH_3)$ | 3 | 3 |
| 111 | 2a | $CH_3O$ | $OCH_3$ | $CH(CH_3)CH_2O$ | $OCH_2CH_2$ | 3 | 3 |
| 112 | 2a | $CH_3O$ | $OCH_3$ | $CH(CH_3)CH_2O$ | $OCH_2CH(CH_3)$ | 4 | 4 |
| 113 | 2a | $CH_3O$ | $OCH_3$ | $CH(CH_3)CH_2O$ | $OCH_2CH(CH_3)$ | 5 | 5 |
| 114 | 2a | $CH_3O$ | $OCH_3$ | $CH(CH_3)CH_2O$ | $OCH_2CH(CH_3)$ | 6 | 6 |
| 115 | 2a | $CH_2=CHCOO$ | $OCOCH=CH_2$ | $CH_2CH_2O$ | $OCH_2CH_2$ | 3 | 3 |
| 116 | 2a | $CH_2=CHCOO$ | $OCOCH=CH_2$ | $CH(CH_3)CH_2O$ | $OCH_2CH(CH_3)$ | 3 | 3 |
| 117 | 2a | $CH_2=CHCOO$ | $OCOCH=CH_2$ | $CH_2CH_2O$ | $OCH_2CH_2$ | 4 | 4 |
| 118 | 2a | $CH_2=CHCOO$ | $OCOCH=CH_2$ | $CH(CH_3)CH_2O$ | $OCH_2CH(CH_3)$ | 4 | 4 |
| 119 | 2a | $CH_3O$ | $OCOCH=CH_2$ | $CH_2CH_2O$ | $OCH_2CH_2$ | 3 | 3 |
| 120 | 2a | $CH\equiv CCOO$ | $OCOC\equiv CH$ | $CH_2CH_2O$ | $OCH_2CH_2$ | 3 | 3 |

TABLE 9

$R_1-Xm-A-Yn-R_2$

| No. | A | $R_1$ | $R_2$ | X | Y | m | n |
|---|---|---|---|---|---|---|---|
| 121 | 2a | $CH_2=C(CH_3)COO$ | $OCOC(CH_3)=CH_2$ | $CH_2CH_2O$ | $OCH_2CH_2$ | 3 | 3 |
| 122 | 2a | $CH_2=CHCOO$ | $OCH_3$ | $CH_2CH_2O$ | $OCH_2CH_2$ | 3 | 3 |
| 123 | 2a |  |  | $CH_2CH_2O$ | $OCH_2CH_2$ | 3 | 3 |
| 124 | 2b | $CH_3O$ | $OCH_3$ | $CH_2CH_2O$ | $OCH_2CH_2$ | 3 | 3 |
| 125 | 2b | $CH_3O$ | $OCH_3$ | $CH_2CH_2O$ | $OCH_2CH_2$ | 4 | 4 |
| 126 | 2b | $CH_3O$ | $OCH_3$ | $CH_2CH_2O$ | $OCH_2CH_2$ | 6 | 6 |
| 127 | 2c | $CH_3O$ | $OCH_3$ | $CH_2CH_2O$ | $OCH_2CH_2$ | 3 | 3 |
| 128 | 2c | $CH_3O$ | $OCH_3$ | $CH_2CH_2O$ | $OCH_2CH_2$ | 4 | 4 |
| 129 | 2c | $CH_3O$ | $OCH_3$ | $CH_2CH_2O$ | $OCH_2CH_2$ | 7 | 7 |
| 130 | 2d | $CH_3O$ | $OCH_3$ | $CH_2CH_2O$ | $OCH_2CH_2$ | 4 | 4 |
| 131 | 2d | $CH_3O$ | $OCH_3$ | $CH_2CH_2O$ | $OCH_2CH_2$ | 5 | 5 |
| 132 | 2d | $CH_3O$ | $OCH_3$ | $CH_2CH_2O$ | $OCH_2CH_2$ | 8 | 8 |
| 133 | 2e | $CH_3O$ | $OCH_3$ | $CH_2CH_2O$ | $OCH_2CH_2$ | 4 | 4 |

TABLE 10

$R_1-Xm-A-Yn-R_2$

| No. | A | $R_1$ | $R_2$ | X | Y | m | n |
|---|---|---|---|---|---|---|---|
| 134 | 2e | $CH_3O$ | $OCH_3$ | $CH_2CH_2O$ | $OCH_2CH_2$ | 5 | 5 |
| 135 | 2e | $CH_3O$ | $OCH_3$ | $CH_2CH_2O$ | $OCH_2CH_2$ | 6 | 6 |
| 136 | 2f | $CH_3O$ | $OCH_3$ | $CH_2CH_2O$ | $OCH_2CH_2$ | 3 | 3 |
| 137 | 2f | $CH_3O$ | $OCH_3$ | $CH_2CH_2O$ | $OCH_2CH_2$ | 4 | 4 |
| 138 | 2f | $CH_3O$ | $OCH_3$ | $CH_2CH_2O$ | $OCH_2CH_2$ | 7 | 7 |
| 139 | 2g | $CH_3O$ | $OCH_3$ | $CH_2CH_2O$ | $OCH_2CH_2$ | 4 | 4 |
| 140 | 2g | $CH_3O$ | $OCH_3$ | $CH_2CH_2O$ | $OCH_2CH_2$ | 5 | 5 |
| 141 | 2g | $CH_3O$ | $OCH_3$ | $CH_2CH_2O$ | $OCH_2CH_2$ | 8 | 8 |
| 142 | 2h | $CH_3O$ | $OCH_3$ | $CH_2CH_2O$ | $OCH_2CH_2$ | 3 | 3 |
| 143 | 2h | $CH_3O$ | $OCH_3$ | $CH_2CH_2O$ | $OCH_2CH_2$ | 5 | 5 |
| 144 | 2h | $CH_3O$ | $OCH_3$ | $CH_2CH_2O$ | $OCH_2CH_2$ | 6 | 6 |
| 145 | 2i | $CH_3O$ | $OCH_3$ | $CH_2CH_2O$ | $OCH_2CH_2$ | 3 | 3 |
| 146 | 2i | $CH_3O$ | $OCH_3$ | $CH_2CH_2O$ | $OCH_2CH_2$ | 4 | 4 |
| 147 | 2i | $CH_3O$ | $OCH_3$ | $CH_2CH_2O$ | $OCH_2CH_2$ | 7 | 7 |
| 148 | 2a | HO | OH | $CH_2CH_2O$ | $OCH_2CH_2$ | 3 | 3 |

TABLE 11

$R_1-Xm-A-Yn-R_2$

| No. | A | $R_1$ | $R_2$ | X | Y | m | n |
|---|---|---|---|---|---|---|---|
| 149 | 2a | HO | OH | $CH_2CH_2O$ | $OCH_2CH_2$ | 4 | 4 |
| 150 | 2a | HO | $OCH_3$ | $CH_2CH_2O$ | $OCH_2CH_2$ | 5 | 5 |
| 151 | 3a | $CH_3O$ | $OCH_3$ | $CH_2CH_2O$ | $OCH_2CH_2$ | 3 | 3 |
| 152 | 3a | $CH_3O$ | $OCH_3$ | $CH_2CH_2O$ | $OCH_2CH_2$ | 4 | 4 |
| 153 | 3b | $CH_3O$ | $OCH_3$ | $CH_2CH_2O$ | $OCH_2CH_2$ | 4 | 4 |
| 154 | 2a | $CH_3O$ | $OCOCH=CH_2$ | $CH_2CH_2O$ | $OCH_2CH_2$ | 4 | 3 |
| 155 | 2j | $CH_3O$ | $OCH_3$ | $CH_2CH_2O$ | $OCH_2CH_2$ | 4 | 4 |
| 156 | 2j | $CH_3O$ | $OCH_3$ | $CH_2CH_2O$ | $OCH_2CH_2$ | 5 | 5 |

Specific examples of the above-mentioned polymeric mesomorphic compound of the formula (2'), (3') or (4') may include those shown in Tables 12 and 13 (Example Compounds Nos. 157 to 163) below, but the polymeric mesomorphic compound of the present invention is not restricted to these compounds.

In the tables, mesogen group 2a as the group A is the same group as defined above.

TABLE 12

(R1 or R11)—Xm—A—Yn (R2 or R12)

| No. | A | $R_1$ or $R_{11}$ | $R_2$ or $R_{12}$ | X | Y | m | n |
|---|---|---|---|---|---|---|---|
| 157 | 2a | $CH_3O$ | —O—C(=O)—CH(CH_2—)_t— | $CH_2CH_2O$ | $OCH_2CH_2$ | 4 | 3 |
| 158 | 2a | —CH(CH_2—)_s—C(=O)—O— | —O—C(=O)—CH(CH_2—)_t— | $CH_2CH_2O$ | $OCH_2CH_2$ | 3 | 3 |
| 159 | 2a | $CH_3O$ | —C(=O)—C(CH_3)(CH_2—)_t— | $CH_2CH_2O$ | $OCH_2CH_2$ | 3 | 3 |
| 160 | 2a | —CH(CH_2—)_s—C(=O)—O— | $OCH_3$ | $OCH(CH_3)CH_2$ | $OCH(CH_3)CH_2$ | 3 | 3 |

TABLE 13

($R_1$ or $R_{11}$) —Xm—A—Yn— ($R_2$ or $R_{12}$)

| No. | A | $R_1$ or $R_{11}$ | $R_2$ or $R_{12}$ | X | Y | m | n |
|---|---|---|---|---|---|---|---|
| 161 | 2a | $H_3C$—C(CH_2—)_s—C(=O)—O— | —C(=O)—C(CH_3)(CH_2—)_t— | $CH_2CH_2O$ | $OCH_2CH_2$ | 4 | 4 |
| 162 | 2a | —O—CH(CH_2O—)—CH_2(—)_s | $OCH_3$ | $CH_2CH_2O$ | $OCH_2CH_2$ | 4 | 3 |
| 163 | 2a | —O—CH(CH_2O—)—CH_2(—)_s | —OH_2C—CH(O—)—CH_2(—)_t | $CH_2CH_2O$ | $OCH_2CH_2$ | 4 | 4 |

In Tables 12 and 13, s and t are respectively an integer of 2–100.

Figure 1:
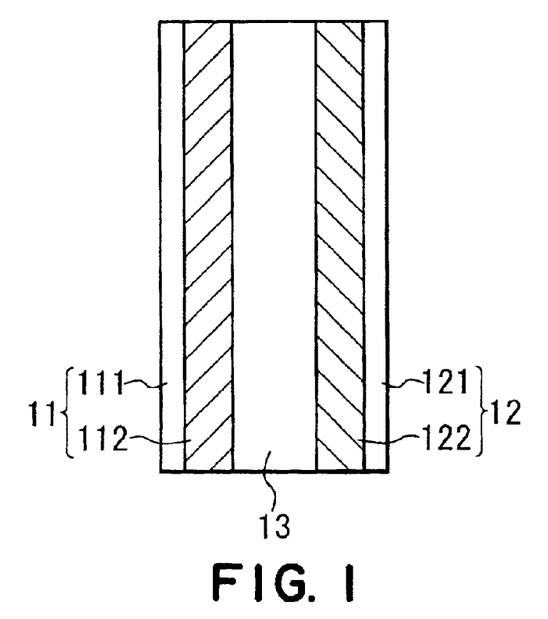
FIG. 1 is a schematic sectional view of an embodiment of secondary battery including the electrolyte according to the present invention.

Hereinbelow, an embodiment of a secondary battery using the electrolyte according to the present invention will be described with reference to FIG. 1 showing a schematic sectional view thereof.

Referring to FIG. 1, the secondary battery comprises a negative electrode 11, a positive electrode 12 and layer 13 of an electrolyte disposed therebetween.

A specific-polarity ion is transferred from the negative electrode 11 to the positive electrode 12 or from the positive electrode 12 to the negative electrode 11 via the electrolyte layer 13 as an ion-transporting passage.

The negative and positive electrodes 11 and 13 may each generally be a composite member comprising a plurality of layers of a function-separated type in order to realize various functions, such as ion dissociation and absorption functions, cooperative or associative function with an external device (e.g., electron transfer function), mechanically supporting function, etc.

Specifically, the negative electrode 11 comprises an electroconductive support 111 (having also an electronically connecting function with an external circuit) of, e.g., copper, aluminum, gold or platinum and a coating layer 112 of an negative active substance disposed on the support 111. It is also possible to use a layer of a negative active substance having also the function as the support.

The negative active substance has a function of releasing cations including alkali metal ion (e.g., Li ion, Na ion or K ion), alkali-earth metal ion, and H ion.

Examples of the negative active substance may include: metallic materials, such as lithium metal foil and lithium-aluminum alloy; polymeric materials, such as n-type doped polyacetylene, polythiophene, poly-p-phenylene, polyacene, and their derivatives; carbon-based materials, such as graphite, pitch and cokes; sintered products of organic polymers; and composite materials of organic polymers with the above-mentioned materials. These materials may appropriately used selectively.

The positive electrode 12 comprises an electroconductive support 121 (having also an electronically connecting function with an external circuit) of, e.g., copper, aluminum, gold or platinum and a coating layer 122 of an positive active substance disposed on the support 121. It is also possible to use a layer of a positive active substance having also the function as the support.

Examples of the positive active substance may include: metallic materials including calcogenides and oxides of transfer metals, such as cobalt, vanadium, titanium, molybdenum, iron, manganese and composites of these compounds with lithium; polymeric materials, such as p-type or n-type doped polyacetylene, polyaniline, polypyrrole, polythiophene, poly-p-phenylene, polyacene, polyphthalocyanine, polypyridine and their derivatives; carbon-based layered materials, such as graphite, fluorinated carbon and composite materials of organic polymers with the above-mentioned materials. These materials may appropriately used selectively.

Hereinbelow, the present invention will be described more specifically based on Examples.

EXAMPLE 1

Production of 4-[methyloxydi(ethyleneoxy) ethyloxy-4'-biphenyl 4'-[methyloxydi(ethyleneoxy) ethyloxy]-4-biphenylcarboxylate (Example Compound No. 1)

(1) Production of methyloxydi(ethyleneoxy)ethyloxytosylate

In a 100 ml-round bottomed flask, 20 g (122 mM) of triethylene glycol monomethyl ether and 20 ml of pyridine were placed and cooled to 0° C. on an ice bath. To the mixture, 30.2 g (158 mM) of p-toluenesulfonyl chloride was gradually added, followed by stirring for 12 hours at 0° C. To the reaction mixture, water was added, followed by extraction with chloroform. The organic layer was dried with anhydrous sodium sulfate, followed by distilling-off of the solvent under reduced pressure and purification by silica gel column chromatography (chloroform/methanol=100/1) to obtain 36.8 g (116 mM) of methyloxydi(ethyleneoxy)ethyloxytosylate (Yield: 95 %).

(2) Production of 4'-[methyloxydi(ethyleneoxy)-ethyloxy]-4-biphenylcarboxylic acid In a 500 ml-round bottomed flask, 3 g (14 mm) of 4'-hydroxy-4-biphenylcarboxylic acid, 1.8 g of potassium hydroxide and 250 ml of methanol were placed and heat-refluxed for 1 hour. To the mixture, 4.2 g (14 mM) of methyloxydi(ethyleneoxy)ethyloxytosylate was added, followed by heat-refluxing for 24 hours.

After the reaction, the reaction mixture was cooled to room temperature and neutralized with 1N—HCl, followed by addition of water and extraction with chloroform. The organic layer was dried with anhydrous sodium sulfate, followed by distilling-off of the solvent under reduced pressure and purification by silica gel column chromatography (chloroform/methanol=30/1) to obtain 4.3 g (12.0 mM) of 4'-[methyloxydi(ethyleneoxy)ethyloxy]-4-biphenyl-carboxylic acid in a form of white solid (Yield: 61 %).

(3) Production of 4'-[methyloxydi(ethyleneoxy)-ethyloxy]-4-hydroxybiphenyl

In a 500 ml-round bottomed flask, 2.6 g (14 mM) of 4,4'-biphenol, 1.8 g of potassium hydroxide and 250 ml of methanol were placed and heat-refluxed for 1 hour. To the mixture, 4.2 g (14 mM) of methyloxydi(ethyleneoxy) ethyloxytosylate was added, followed by heat-refluxing for 24 hours. After the reaction, the reaction mixture was cooled to room temperature and neutralized with 1N—HCl, followed by addition of water and extraction with chloroform. The organic layer was dried with anhydrous sodium sulfate, followed by distilling-off of the solvent under reduced pressure and purification by silica gel column chromatography (chloroform/methanol=50/1) to obtain 2.5 g (7.5 mM) of 4'-[methyloxydi(ethyleneoxy)ethyloxy-4-hydroxybiphenyl (white solid) (Yield: 53.6 %).

(4) Production of 4-[methyloxydi(ethyleneoxy)-ethyloxy]-4'-biphenyl 4'-[methyloxydi(ethyleneoxy)-ethyloxy]-4-biphenylcarboxylate (Ex. Comp. No. 1)

In a 100 ml-round bottomed flask, 1.41 g (3.9 mM) of 4'-[methyloxydi(ethyleneoxy)ethyloxy]-4-biphenylcarboxylic acid, 1.30 g (3.9 mM) of 4'-[methyloxydi(ethyleneoxy)ethyloxy]-4-hydroxybiphenyl, 0.4 g (5.1 m) of 1,3-dicyclocarbodiimide, 0.48 g (3.9 mM) of 4-dimethylaminopyridine and 20 ml of dry chloroform were placed and stirred at room temperature for 24 hours.

After the reaction, water was added to the reaction mixture, followed by extraction with chloroform. The organic layer was dried with anhydrous sodium sulfate, followed by distilling-off of the solvent under reduced pressure, purification by silica gel column chromatography (chloroform/methanol=30/1) and recrystallization from a mixture solvent (methanol/acetone=1/1) to obtain 1.8 g (2.6 mM) of 4-[methyloxydi(ethyleneoxy)ethyloxy]-4'-biphenyl 4'-[methyloxydi(ethyleneoxy)ethyloxy]-4-biphenyl-carboxylate (Ex. Comp. No. 1) in a form of a white solid (Yield: 66.6 %).

The thus-obtained compound (Ex. Comp. No. 1) showed the following NMR (nuclear magnetic resonance) data and phase transition series.

$^1$H-NMR (CDCl$_3$/TMS, σ ppm): 3.4 (6H, s), 3.6–4.2 (24H, m), 7.0 (4H, m), 7.3 (2H, d), 7.5–7.7 (8H, m) and 8.3 (2H, d).

Cry.: crystal phase; SmX: higher-order smectic phase; SmC: smectic C phase; N: nematic phase; and Iso.: isotropic phase.

EXAMPLE 2

(1) Production of a liquid crystal electrolyte A

To 101 mg (0.15 mM) of the compound (Ex. Comp. No. 1) prepared in Example 1, 4 ml of dry chloroform was added, followed by stirring to completely dissolve the compound. To the solution, 1 ml-THF (tetrahydrofuran) solution of 7.02 mg (0.045 mM) of lithium trifluoromethanesulfonate was added, followed by stirring for 2 hours. After the stirring, the solvent was gradually distilled off under reduced pressure and the resultant mixture was dried under reduced pressure to prepare a liquid crystal electrolyte A.

Figure 2:
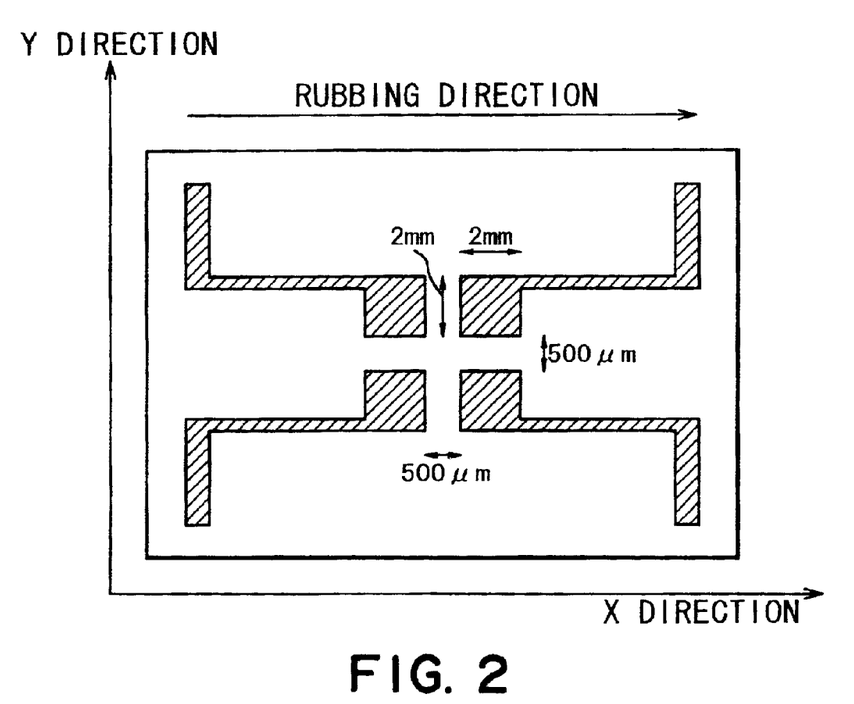
FIG. 2 is a schematic plan view a cell structure having a prescribed pattern for measuring an ion conductivity.

SmA : smectic A phase (2) Evaluation of ion conductivity of liquid crystal electrolyte A One of a pair of glass substrates was coated with a 400 Å-thick film of gold and subjected to etching to have a pattern as shown in FIG. 2. On each of the pair of glass substrates, a 1.5%-polyimide resin precursor ("SP-710", mfd. by Toray K.K.) in dimethylacetamide was applied by spinner coating at 2000 rpm for 15 sec., followed by hot-baking for condensation at 300° C. for 60 min., thus forming a ca. 250 Å-thick polyimide film. Each of the resultant glass substrates was subjected to rubbing with an acetate fiber-planted cloth and washed with an isopropyl alcohol solution. On one of the thus-treated glass substrates, silicon beads (average diameter=2.0 μm) were dispersed and then, the pair of glass substrates were applied to each other via a sealing adhesive ("Stractbond", mfd. by Mitsui Toatsu Kagaku Kogyo K. K.) so that the respective rubbing axes are parallel to each other, followed by hot-drying at 170° C. for 60 min. to prepare a blank cell.

Into the thus-prepared cell, the liquid crystal electrolyte A was injected in an isotropic liquid state and cooled from the isotropic liquid temperature to a smectic A phase temperature at a rate of 20° C./hour to prepare a liquid crystal cell A.

When a texture of the resultant liquid crystal cell A was observed through a polarizing microscope under a cross-nicol relationship, a uniform homogeneous alignment state of smectic A phase was confirmed.

Further, when the liquid crystal cell A was subjected to measurement of ionic conductivity in the following manner.

The liquid crystal cell A (having the pattern shown in FIG. 2) was supplied with an AC-voltage (0.001–100 kHz, 3000 mV) to measure a current value.

Based on the measured current value, a complex impedance was obtained to calculate an ionic conductivity (σ) according to the following equation:

$$\sigma = d/(Z \times S),$$

wherein σ is an ionic conductivity, d is a thickness of the electrolyte layer, Z is the complex impedance, and S is an electrode area.

The results are shown below.

| Temp. (° C.) | Ionic conductivity (S/cm) |
|---|---|
| (X direction) | |
| 140 | 1.2 × 10$^{-6}$ |
| 160 | 3.8 × 10$^{-6}$ |
| 180 | 1.2 × 10$^{-4}$ |
| (Y direction) | |
| 140 | 1.6 × 10$^{-4}$ |
| 160 | 2.2 × 10$^{-4}$ |
| 180 | 3.1 × 10$^{-4}$ |

EXAMPLE 3

A liquid crystal electrolyte B was prepared in the same manner as in (1) of Example 2 except that the compound (Ex. Comp. No. 1) was changed to 108 mg (0.15 mM) of a compound (Ex. Comp. No. 10).

A liquid crystal cell B was prepared and evaluated in the same manner as in (2) of Example 2 except that the liquid crystal electrolyte A was changed to the above-prepared liquid crystal electrolyte B.

The results are shown below.

| Direction | Temp. | Ionic conductivity |
|---|---|---|
| X | 120° C. | 1.5 × 10$^{-5}$ S/cm |
| Y | 120° C. | 1.8 × 10$^{-4}$ S/cm |

EXAMPLE 4

A liquid crystal electrolyte C was prepared in the same manner as in (1) of Example 2 except that the compound (Ex. Comp. No. 1) was changed to 100.5 mg (0.15 mM) of a compound (Ex. Comp. No. 136).

A liquid crystal cell C was prepared and evaluated in the same manner as in (2) of Example 2 except that the liquid crystal electrolyte A was changed to the above-prepared liquid crystal electrolyte C.

The results are shown below.

| Direction | Temp. | Ionic conductivity |
|---|---|---|
| X | 140° C. | 1.0 × 10$^{-5}$ S/cm |
| Y | 140° C. | 1.5 × 10$^{-4}$ S/cm |

EXAMPLE 5

A liquid crystal electrolyte D was prepared in the same manner as in (1) of Example 2 except that the compound (Ex. Comp. No. 1) was changed to 100.2 mg (0.15 mM) of a compound (Ex. Comp. No. 139).

A liquid crystal cell D was prepared and evaluated in the same manner as in (2) of Example 2 except that the liquid crystal electrolyte A was changed to the above-prepared liquid crystal electrolyte D.

The results are shown below.

| Direction | Temp. | Ionic conductivity |
|-----------|-------|--------------------|
| X | 140° C. | $1.2 \times 10^{-5}$ S/cm |
| Y | 140° C. | $2.2 \times 10^{-4}$ S/cm |

EXAMPLE 6

Production of 4-[methyloxytri(ethyleneoxy) ethyloxy-4'-biphenyl 4'-[methyloxytri(ethyleneoxy) ethyloxy]-4-biphenylcarboxylate (Example Compound No. 11)

(1) Production of methyloxytri(ethyleneoxy) ethyloxytosylate

In a 100 ml-round bottomed flask, 20 g (96 mM) of tetraethylene glycol monomethyl ether and 20 ml of pyridine were placed and cooled to 0° C. on an ice bath. To the mixture, 23.8 g (125 mM) of p-toluenesulfonyl chloride was gradually added, followed by stirring for 12 hours at 0° C. To the reaction mixture, water was added, followed by extraction with chloroform. The organic layer was dried with anhydrous sodium sulfate, followed by distilling-off of the solvent under reduced pressure and purification by silica gel column chromatography (chloroform/methanol=100/1) to obtain 34.5 g (95.2 mM) of methyloxytri(ethyleneoxy) ethyloxytosylate (Yield: 99 %)

(2) Production of 4'-[methyloxytri(ethyleneoxy)ethyloxy]-4-biphenylcarboxylic acid In a 500 ml-round bottomed flask, 5 g (23 mm) of 4'-hydroxy-4-biphenylcarboxylic acid, 3.3 g of potassium hydroxide and 400 ml of methanol were placed and heat-refluxed for 1 hour. To the mixture, 8.5 g (23 mM) of methyloxytri(ethyleneoxy)ethyloxytosylate was added, followed by heat-refluxing for 24 hours.

After the reaction, the reaction mixture was cooled to room temperature and neutralized with 1N—HCl, followed by addition of water and extraction with chloroform. The organic layer was dried with anhydrous sodium sulfate, followed by distilling-off of the solvent under reduced pressure and purification by silica gel column chromatography bile (chloroform/methanol=30/1) to obtain 3.8 g (9.4 mM) of 4'-[methyloxytri(ethyleneoxy)ethyloxy]-4-biphenylcarboxylic acid in a form of white solid (Yield: 40

(3) Production of 4'-[methyloxytri(ethyleneoxy)ethyloxy]-4-hydroxybiphenyl

In a 500 ml-round bottomed flask, 2.6 g (14 mM) of 4,4'-biphenol, 1.8 g of potassium hydroxide and 250 ml of methanol were placed and heat-refluxed for 1 hour. To the mixture, 5.1 g (14 mM) of methyloxytri(ethyleneoxy) ethyloxytosylate was added, followed by heat-refluxing for 24 hours. After the reaction, the reaction mixture was cooled to room temperature and neutralized with 1N—HCl, followed by addition of water and extraction with chloroform. The organic layer was dried with anhydrous sodium sulfate, followed by distilling-off of the solvent under reduced pressure and purification by silica gel column chromatography (chloroform/methanol=50/1) to obtain 1.8 g (4.7 mM) of 4'-[methyloxytri(ethyleneoxy)ethyloxy-4-hydroxybiphenyl (white solid) (Yield: 33.6 %).

(4) Production of 4-[methyloxytri(ethyleneoxy)ethyloxy]-4'-biphenyl 4'-[methyloxytri(ethyleneoxy)ethyloxy]-4-biphenylcarboxylate (Ex. Comp. No. 11)

In a 100 ml-round bottomed flask, 2 g (5.0 mM) of 4'-[methyloxytri(ethyleneoxy)ethyloxy]-4-biphenylcarboxylic acid, 1.9 g (5.0 mM) of 4'-[methyloxytri(ethyleneoxy)ethyloxy]-4-hydroxybiphenyl, 0.8 g (10 mM) of 1,3-dicyclocarbodiimide, 0.6 g (5 MM) of 4-dimethylaminopyridine and 20 ml of dry chloroform were placed and stirred at room temperature for 24 hours.

After the reaction, water was added to the reaction mixture, followed by extraction with chloroform. The organic layer was dried with anhydrous sodium sulfate, followed by distilling-off of the solvent under reduced pressure, purification by silica gel column chromatography (chloroform/methanol=30/1) and recrystallization from acetone to obtain 2.9 g (3.8 mM) of 4-[methyloxytri(ethyleneoxy)ethyloxy]-4'-biphenyl 4'-[methyloxytri(ethyleneoxy)-ethyloxy]-4-biphenylcarboxylate (Ex. Comp. No. 11) in a form of a white solid (Yield: 75.2 %).

The thus-obtained compound (Ex. Comp. No. 11) showed the following NMR (nuclear magnetic resonance) data and phase transition series.

$^1$H-NMR (CDCl$_3$/TMS, σ ppm): 3.4 (6H, s), 3.6–4.2 (32H, m), 7.0 (4H, m), 7.3 (2H, d), 7.5–7.7 (8H, m) and 8.2 (2H, d).

Phase transition temperature (° C.)

EXAMPLE 7

(1) Production of a liquid crystal electrolyte E

To 50 mg (0.066 mM) of the compound (Ex. Comp. No. 11) prepared in Example 6, 4 ml of dry chloroform was added, followed by stirring to completely dissolve the compound. To the solution, 1 ml-THF (tetrahydrofuran) solution of 4.09 mg (0.026 mM) of lithium trifluoromethanesulfonate was added, followed by stirring for 2 hours. After the stirring, the solvent was gradually distilled off under reduced pressure and the resultant mixture was dried under reduced pressure to prepare a liquid crystal electrolyte E.

Phase transition temperature (° C.)

(2) Evaluation of ion conductivity of liquid crystal electrolyte E

A liquid crystal cell E was prepared and evaluated in the same manner as in (2) of Example 2 except that the liquid crystal electrolyte A was changed to the above-prepared liquid crystal electrolyte E.

When a texture of the resultant liquid crystal cell E was observed through a polarizing microscope under a cross-nicol relationship, a uniform homogeneous alignment state of smectic A phase was confirmed.

The results of measurement of ion conductivity are shown below.

| Temp. (° C.) | Ionic conductivity (S/cm) |
|---|---|
| (X direction) | |
| 40 | $5.2 \times 10^{-7}$ |
| 80 | $2.0 \times 10^{-6}$ |
| 120 | $1.2 \times 10^{-4}$ |
| (Y direction) | |
| 40 | $3.2 \times 10^{-5}$ |
| 80 | $1.2 \times 10^{-4}$ |
| 120 | $3.3 \times 10^{-4}$ |

EXAMPLE 8

(1) Production of a liquid crystal electrolyte F

To 30 mg (0.039 mM) of the compound (Ex. Comp. No. 11) prepared in Example 6, 4 ml of dry chloroform was added, followed by stirring to completely dissolve the compound. To the solution, 1 ml-THF (tetrahydrofuran) solution of 4.52 mg (0.016 mM) of Li(CF$_3$SO$_2$)$_2$N was added, followed by stirring for 2 hours. After the stirring, the solvent was gradually distilled off under reduced pressure and the resultant mixture was dried under reduced pressure to prepare a liquid crystal electrolyte F.

(2) Evaluation of ion conductivity of liquid crystal electrolyte F

A liquid crystal cell F was prepared and evaluated in the same manner as in (2) of Example 2 except that the liquid crystal electrolyte A was changed to the above-prepared liquid crystal electrolyte F.

When a texture of the resultant liquid crystal cell F was observed through a polarizing microscope under a cross-nicol relationship, a uniform homogeneous alignment state of smectic A phase was confirmed.

The results of measurement of ion conductivity are shown below.

| Temp. (° C.) | Ionic conductivity (S/cm) |
|---|---|
| (X direction) | |
| 40 | $7.0 \times 10^{-6}$ |
| 80 | $4.1 \times 10^{-6}$ |
| 120 | $2.9 \times 10^{-4}$ |
| (Y direction) | |
| 40 | $2.6 \times 10^{-4}$ |
| 80 | $1.1 \times 10^{-3}$ |
| 120 | $2.7 \times 10^{-3}$ |

EXAMPLE 9

Production of 4-[methyloxytri(ethyleneoxy) ethyloxy-4'-biphenyl 4'-[methyloxytri(ethyleneoxy) ethyloxy]-4-biphenylcarboxylate (Example Compound No. 125)

(1) Production of 4-methyloxytri(ethyleneoxy)ethyloxy-1-benzyloxybenzene

In a 100 ml-round bottomed flask, 1.1 g (5.5 mM) of 4-benzyloxyphenol and 15 ml of DMF were placed and cooled on an ice bath. To the mixture on the ice bath, 2.0 g (5.5 mM) of methyloxytri(ethyleneoxy)ethyloxy tosylate and 3.6 g (11 mM) of cesium carbonate were added, followed by stirring for 3 hours and stirring for 72 hours after the system as restored to room temperature. The reaction mixture was subjected to distilling-off of the solvent under reduced pressure and, to the reaction mixture, water was added, followed by extraction with chloroform. The organic layer was washed with saturated common salt aqueous solution and dried with anhydrous sodium sulfate, followed by distilling-off of the solvent under reduced pressure and purification by silica gel column chromatography (chloroform/methanol=100/1) to obtain 1.7 g (4.4 mM) of 4-methyloxytri(ethyleneoxy)ethyloxy-1-benzyloxybenzene (Yield: 79 %).

(2) Production of 4-methyloxytri(ethyleneoxy)-ethyloxyphenol

In a 100 ml-round bottomed flask, 1.7 g (4.4 mm) of 4-methyloxytri(ethyleneoxy)ethyloxy-1-benzyloxybenzene, 50 ml of ethanol and 0.4 g of 10 %-Pd/C were placed. The system was aerated with hydrogen gas and stirred for 8 hours at room temperature. The reaction mixture was subjected to filtration under reduced pressure. The filtrate was subjected to distilling-off of the solvent under reduced pressure, followed by addition of water and extraction with chloroform. The organic layer was dried with anhydrous sodium sulfate, followed by distilling-off of the solvent under reduced pressure to obtain 1.3 g (4.2 mM) of 4-methyloxytri(ethyleneoxy)ethyloxyphenol (Yield: 96 %).

(3) Production of 4-methyloxytri(ethyleneoxy) ethyloxyphenyl 4'-[methyloxytri(ethyleneoxy)ethyloxy]-4-biphenylcarboxylate (Ex. Comp. No. 125)

In a 100 ml-round bottomed flask, 2 g (5.0 mM) of 4'-[methyloxytri(ethyleneoxy)ethyloxy]-4-biphenylcarboxylic acid, 1.5 g (5.0 mM) of 4-methyloxytri(ethyleneoxy)ethyloxyphenol, 0.8 g (10 mM) of 1,3-dicyclocarbodiimide, 0.6 g (5 mM) of 4-dimethylaminopyridine and 20 ml of dry chloroform were placed and stirred at room temperature for 24 hours.

After the reaction, water was added to the reaction mixture, followed by extraction with chloroform. The organic layer was dried with anhydrous sodium sulfate, followed by distilling-off of the solvent under reduced pressure, and purification by silica gel column chromatography (chloroform/methanol=50/1) to obtain 1.0 g (1.6 mM) of 4-methyloxytri(ethyleneoxy)ethyloxyphenyl 4'-[methyloxytri(ethyleneoxy)ethyloxy]-4-biphenylcarboxylate (Ex. Comp. No. 125) in a form of a white solid (Yield: 33 %).

The thus-obtained compound (Ex. Comp. No. 125) showed the following NMR (nuclear magnetic resonance) data and phase transition series.

$^1$H-NMR (CDCl$_3$/TMS, σ ppm): 3.4 (6H, s), 3.6–4.2 (32H, m), 7.0 (4H, m), 7.1 (2H, d), 7.6–7.7 (4H, m) and 8.2 (2H, d).

EXAMPLE 10

(1) Production of a liquid crystal electrolyte G

To 30 mg (0.0044 mM) of the compound (Ex. Comp. No. 125) prepared in Example 9, 4 ml of dry chloroform was added, followed by stirring to completely dissolve the compound. To the solution, 1 ml-THF (tetrahydrofuran) solution of 2.73 mg (0.017 mM) of lithium trifluoromethanesulfonate was added, followed by stirring for 2 hours. After the stirring, the solvent was gradually distilled off under reduced pressure and the resultant mixture was dried under reduced pressure to prepare a liquid crystal electrolyte G.

Phase transition temperature (° C.)

(2) Evaluation of ion conductivity of liquid crystal electrolyte G

A liquid crystal cell G was prepared and evaluated in the same manner as in (2) of Example 2 except that the liquid crystal electrolyte A was changed to the above-prepared liquid crystal electrolyte G.

When a texture of the resultant liquid crystal cell G was observed through a polarizing microscope under a cross-nicol relationship, a uniform homogeneous alignment state of smectic A phase was confirmed.

The results of measurement of ion conductivity are shown below.

| Temp. (° C.) | Ionic conductivity (S/cm) |
|---|---|
| (X direction) | |
| 20 | $8.6 \times 10^{-6}$ |
| 40 | $4.2 \times 10^{-6}$ |
| 60 | $2.2 \times 10^{-4}$ |
| (Y direction) | |
| 20 | $1.5 \times 10^{-4}$ |
| 40 | $3.3 \times 10^{-4}$ |
| 60 | $2.2 \times 10^{-4}$ |

EXAMPLE 11

Production of 4'-[acryloyloxydi(ethyleneoxy) ethyloxy-4'-biphenyl 4'-[methyloxytri(ethyleneoxy) ethyloxy]-4-biphenylcarboxylate (Example Compound No. 154)

(1) Production of 4'-hydroxydi(ethyleneoxy)ethyloxy-4-hydroxybiphenyl

In a reaction vessel, 1.9 g (10 mm) of 4,4'-biphenol, 3.0 g of potassium carbonate and 40 ml of ethanol were placed and heat-refluxed for 3 hours. To the mixture, 1.7 g (10 mM) of hydroxytri(ethyleneoxy)ethyl chloride was added, followed by heat-refluxing for 24 hours.

After the reaction, the reaction mixture was cooled to room temperature and subjected to filtration. The filtrate was subjected to distillation under reduced pressure and neutralized with 1N—HCl, followed by addition of water and extraction with chloroform. The organic layer was dried with anhydrous sodium sulfate, followed by distilling-off of the solvent under reduced pressure and purification by silica gel column chromatography (ethylacetate) to obtain 1.8 g (5.7 mM) of 4'-hydroxydi(ethyleneoxy)ethyloxy-4-hydroxy biphenyl (Yield: 57 %).

(2) Production of 4-[hydroxydi(ethyleneoxy)ethyloxy]-4'-biphenyl 4'-[methyloxytri(ethyleneoxy)ethyloxy]-4-biphenyl carbonate In a reaction vessel, 1 g (5 mM) of 4'-[methyloxytri (ethyleneoxy)ethyloxy]-4-biphenyl carboxylic acid, 0.8 g (2.5 mM) of 4'-hydroxydi(ethyleneoxy) ethyloxy-4-hydroxy-biphenyl, 1.0 g (5 mM) of 1,3-dicyclocarbodiimide, 0.3 g (2.5 mM) of dimethylaminopyridine and 20 ml of dry chloroform were placed and stirred for 24 hours at room temperature. After the reaction, to the reaction mixture, water was added, followed by extraction with chloroform. The organic layer was dried with anhydrous sodium sulfate, followed by distilling-off of the solvent under reduced pressure and purification by silica gel column chromatography (chloroform/methanol=50/1) to obtain 1.1 g (1.5 mM) of 4-[hydroxydi(ethyleneoxy) ethyloxy-4'-biphenyl 4'-[methyloxytri(ethyleneoxy) ethyloxy]-4'-biphenyl carbonate (Yield: 60 %).

(3) Production of 4-[acryloxyloxydi(ethyleneoxy)ethyloxy]-4'-biphenyl 4'-[methyloxytri(ethyleneoxy)ethyloxy]-4-biphenylcarboxylate (Ex. Comp. No. 154)

In a reaction vessel, 200 mg (0.28 mM) of 4-[hydroxydi (ethyleneoxy)ethyloxy]-4'-biphenyl, 4'-[methyloxytri (ethyleneoxy)ethyloxy)-4-biphenylcarboxylate, 0.1 ml of triethylamine and 5 ml of dry chloroform were placed and cooled to 0° C. on an ice bath. To the mixture, 70 mg (0.79 mM) of acrylic acid chloride was gradually added dropwise, followed by stirring for 4 hours at 0° C.

After the reaction, water was added to the reaction mixture, followed by extraction with chloroform. The organic layer was dried with anhydrous sodium sulfate, followed by distilling-off of the solvent under reduced pressure, purification by silica gel column chromatography (chloroform/methanol=50/1) and recrystallization from (methanol/acetone) to obtain 140 mg (0.18 mM) of 4-[acryloxyloxydi(ethyleneoxy)ethyloxy]-4'-biphenyl 4'-[methyloxytri(ethyleneoxy)ethyloxy]-4-biphenylcarboxylate (Ex. Comp. No. 154) in a form of a white solid (Yield: 69 %).

The thus-obtained compound (Ex. Comp. No. 154) showed the following NMR (nuclear magnetic resonance) data and phase transition series.

$^1$H-NMR (CDCl$_3$/TMS, σ ppm): 3.4 (3H, s), 3.6–4.3 (38H, m), 5.8 (1H, d), 6.2 (1H, q), 6.4 (1H, d), 7.0 (4H, m), 7.3 (2H, d), 7.5–7.7 (8H, m) and 8.2 (2H, d).

Phase transition temperature (° C.)

EXAMPLE 12

(1) Production of a liquid crystal electrolyte H

To 154.50 mg (0.066 mM) of the compound (Ex. Comp. No. 154) prepared in Example 11, 4 ml of dry chloroform 0.5 mg of 2,6-di-t-butyl-4-methyphenol and 2.5 mg of 1-hydroxycyclohexyl phenyl ketone (photopolymerization initiator) were added, followed by stirring to completely dissolve the compound. To the solution, 1 ml-THF (tetrahydrofuran) solution of 4.09 mg (0.026 mM) of lithium trifluoromethane-sulfonate was added, followed by stirring for 2 hours. After the stirring, the solvent was gradually distilled off under reduced pressure and the resultant mixture was dried under reduced pressure to prepare a liquid crystal electrolyte H.

Phase transition temperature (° C.)

(2) Evaluation of ion conductivity of liquid crystal electrolyte H

A liquid crystal cell H was prepared and evaluated in the same manner as in (2) of Example 2 except that the liquid crystal electrolyte A was changed to the above-prepared liquid crystal electrolyte H.

When a texture of the resultant liquid crystal cell H was observed through a polarizing microscope under a cross-nicol relationship, a uniform homogeneous alignment state of smectic A phase was confirmed.

The results of measurement of ion conductivity are shown below.

| Temp. (° C.) | Ionic conductivity (S/cm) |
|---|---|
| (X direction) | |
| 110 | $9.8 \times 10^{-6}$ |
| 130 | $3.1 \times 10^{-5}$ |
| 150 | $1.1 \times 10^{-4}$ |
| (Y direction) | |
| 110 | $7.7 \times 10^{-5}$ |
| 130 | $1.2 \times 10^{-4}$ |
| 150 | $1.6 \times 10^{-4}$ |

EXAMPLE 13

Production of a polymeric liquid crystal electrolyte I (Ex. Comp. No. 157) and evaluation thereof.

A liquid crystal cell I was prepared in the same manner as in (2) of Example 2 except that the liquid crystal electrolyte A was changed to the above-prepared liquid crystal electrolyte I.

When a texture of the resultant liquid crystal cell F was observed through a polarizing microscope under a cross-nicol relationship, a uniform homogeneous alignment state of smectic A phase was confirmed.

Then, the liquid crystal cell I was subjected to UV light irradiation (10 mW/cm$^2$) for 1 min. at 100° C. by using a high-pressure mercury lamp to effect polymerization, thus preparing a polymeric liquid crystal electrolyte I. The polymeric liquid crystal electrolyte I showed and retained smectic A phase in a temperature range of –20° C. to 200° C.

Then, the liquid crystal cell I was subjected to measurement of ion conductivity in the same manner as in (2) of Example 2.

The results are shown below.

| Temp. (° C.) | Ionic conductivity (S/cm) |
|---|---|
| (X direction) | |
| 110 | $1.1 \times 10^{-7}$ |
| 130 | $4.5 \times 10^{-7}$ |
| 150 | $1.7 \times 10^{-6}$ |

| Temp. (° C.) | Ionic conductivity (S/cm) |
|---|---|
| (Y direction) | |
| 110 | $6.9 \times 10^{-5}$ |
| 130 | $8.4 \times 10^{-5}$ |
| 150 | $1.0 \times 10^{-4}$ |

EXAMPLE 14

Production of 2,5-bis[4-methyltrioxytetra(ethyleneoxy)ethyloxyphenyl]pyrimidine (Ex. Comp. No. 155)

In a round-obtained flask, 0.42 g (1.6 mM) of 2,5-bis(4-hydroxyphenyl)pyrimidine, 1.16 g (3.2 mM) of methyloxytri(ethyleneoxy)ethyloxytosylate, 2.09 g (6.4 mM) of cesium carbonate and 10 ml of DMF were placed and stirred for 72 hours at room temperature. After the reaction, to the reaction mixture, chloroform was added to precipitate a crystal. The crystal was removed by filtration and the filtrate was condensed, followed by addition of water and extraction with chloroform. The extract was dried with anhydrous sodium sulfate, followed by distilling-off of the solvent under reduced pressure to obtain a crude product. The crude product was purified by silica gel column chromatography (chloroform/methanol=30/1) and recrystallization from methanol to obtain 0.9 g (1.4 mM) of 2,5-bis[4-methyloxytri(ethyleneoxy)ethyloxyphenyl]pyrimidine (Yield: 88 %).

Phase transition temperature (° C.)

EXAMPLE 15

Production of 2,5-bis[4-methyltrioxytetra(ethyleneoxy)ethyloxyphenyl]pyrimidine (Ex. Comp. No. 156)

In a round-obtained flask, 0.42 g (1.6 mM) of 2,5-bis(4-hydroxyphenyl)pyrimidine, 1.30 g (3.2 mM) of methyloxytetra(ethyleneoxy)ethyloxytosylate, 2.09 g (6.4 mM) of cesium carbonate and 10 ml of DMF were placed and stirred for 72 hours at room temperature. After the reaction, to the reaction mixture, chloroform was added to precipitate a crystal. The crystal was removed by filtration and the filtrate was condensed, followed by addition of water and extraction with chloroform. The extract was dried with anhydrous sodium sulfate, followed by distilling-off of the solvent under reduced pressure to obtain a crude product. The crude product was purified by silica gel column chromatography (chloroform/methanol=30/1) and recrystallization from methanol to obtain 0.8 g (1.1 mM) of 2,5-bis[4-methyloxytetra(ethyleneoxy)ethyloxyphenyl]pyrimidine (Yield: 68 %).

Phase transition temperature (° C.)

As described hereinabove, according to the present invention, it is possible to provide a mesomorphic compound and polymeric mesomorphic compound useful for a smectic liquid crystal material. By using the (polymeric) mesomorphic compound as a component of a liquid crystal electrolyte, it becomes possible to provide the resultant liquid crystal electrolyte with a high ion conductivity and an ion conductivity anisotropy.

Further, the liquid crystal electrolyte is suitable for secondary battery, sensor device, etc., in the field of electrons.

What is claimed is:

1. A secondary battery comprising:
   an electrolyte comprising a metal salt and at least one species of a mesomorphic compound; and
   an electrode,
   wherein the mesomorphic compound has a partial structure comprising (a) a mesomorphic mesogen group and (b) two divalent groups,
   wherein each of the two divalent groups is directly connected to the mesogen group,
   wherein each of the two divalent groups is represented by the following formula:

$(OCH_2CH_2)_x$ or $(OCH_2CH(CH_3))_y$ in which x and y are respectively an integer of 3 to 25, and wherein the electrolyte exhibits a smectic phase.

2. A secondary battery according to claim 1, wherein the electrolyte further comprises an organic solvent.

3. A secondary battery according to claim 1, wherein the electrolyte has been solidified through polymerization.

4. A secondary battery according to claim 1, wherein the electrolyte exhibits an ionic conductivity anisotropy.

5. A secondary battery comprising:
   an electrolyte comprising a metal salt and at least one species of a polymeric mesomorphic compound; and
   an electrode,
   wherein the polymeric mesomorphic compound comprises a polymer obtained through polymerization of a monomer having a partial structure comprising (a) a mesomorphic mesogen group and (b) two divalent groups,
   wherein each of the two divalent groups is directly connected to the mesogen group, and
   wherein each of the two divalent groups is represented by the following formula:

$(OCH_2CH_2)_x$ or $(OCH_2CH(CH_3))_y$ in which x and y are respectively an integer of 3 to 25.

6. A secondary battery according to claim 5, wherein the monomer is represented by the following formula (1'):

$R1-X_m-A-Y_n-R2$         (1'), wherein
   A denotes a mesomorphic mesogen group represented by the formula:

$A1-B1-A2-B2-A3-(B3-A4)_a-(B4-A5)_b-(B5-A6)_c$ in which $0 \leq (a+b+c) \leq 3$; A1, A2 and A3 independently denote 1,4-phenylene optionally having at least one CH replaced by CF or N, or 1,4-cyclohexylene; A4, A5 and A6 independently denote a single bond, 1,4-phenylene optionally having at least one CH replaced by CF or N, or 1,4-cyclohexylene; and B1, B2, B3, B4 and B5 independently denote a single bond, $-CH_2O-$, $-OCH_2-$, $-COO-$ or $-OOC-$;

X denotes $-CH_2CH_2O-$ or $-CH(CH_3)CH_2O-$;
Y denotes $-OCH_2CH_2-$ or $-OCH_2CH(CH_3)-$;
R1 and R2 independently denote a linear or branched alkyl group having 1 to 100 carbon atoms optionally having at least one $-CH_2-$ replaced by $-O-$, $-CO-$, $-S-$, $-CH=CH-$, $-C(CH_3)=CH-$, $-CH=C(CH_3)-$, $-C\equiv C-$ or an epoxy group and optionally having at least one hydrogen atom replaced by a fluorine atom; and
m and n independently denote an integer of 3 to 25.

7. A secondary battery according to claim 6, wherein said polymer is represented by any one of the following formulas (2') to (4'):

$R11-X_m-A-Y_n-R2$         (2')

$R1-X_m-A-Y_n-R12$         (3')

$R11-X_m-A-Y_n-R12$         (4')

wherein
A, X, Y, R1, R2, m and n have the same meanings as defined in the formula (1'); and
R11 and R12 denote the following groups, respectively:

in which s and t independently denote an integer of 2 to 10000; R3 and R4 independently denote a linear or branched alkylene group having 1 to 100 carbon atoms optionally having at least one $-CH_2-$ replaced by $-O-$, $-CO-$ or $-S-$ and optionally having at least one hydrogen atom replaced by a fluorine atom;

8. A secondary battery according to claim 5, wherein the electrolyte exhibits a smectic phase.

9. A secondary battery according to claim 5, wherein the metal salt is an alkali metal salt.

10. A secondary battery according to claim 5, wherein the electrolyte further comprises an organic solvent.

11. A secondary battery according to claim 5, wherein the electrolyte exhibits an ionic conductivity anisotropy.

* * * * *

UNITED STATES PATENT AND TRADEMARK OFFICE
CERTIFICATE OF CORRECTION

PATENT NO.    : 6,936,186 B2
DATED         : August 30, 2005
INVENTOR(S)   : Satoshi Igawa et al.

It is certified that error appears in the above-identified patent and that said Letters Patent is hereby corrected as shown below:

Title page,
Item [56], References Cited, OTHER PUBLICATIONS,
"K. Ito, et al." reference (first occurrence), "of a" should read -- a --.
"M. Watanabe, et al." reference, "LI$^+$" should read -- Li$^+$ --; and "Eelctrolytes" should read -- Electrolytes --.

Column 1,
Line 56, "lower" should read -- lowering --.

Column 5,
Line 34, "denote" should read -- denotes --; and
Line 39, "monomer" should read -- monomer is --.

Column 7,
Lines 1-5,
"  " should be deleted.

Column 17,
Line 41, "an positive" should read -- a positive --; and
Line 56, "used" should read -- be used --.

Column 19,
Lines 8 to 11,
"  " should be deleted.

Column 21,
Line 49, "bile" should be deleted; and
Line 51, "40" should read -- 40%). --.

Column 22,
Line 8, "(5 MM)" should read -- (5 mM) --.

Column 29,
Line 22, "(OCH$_2$CH(CH$_3$)$_y$" should read -- (OCH$_2$CH(CH$_3$))$_y$ --.

UNITED STATES PATENT AND TRADEMARK OFFICE
CERTIFICATE OF CORRECTION

PATENT NO. : 6,936,186 B2
DATED : August 30, 2005
INVENTOR(S) : Satoshi Igawa et al.

It is certified that error appears in the above-identified patent and that said Letters Patent is hereby corrected as shown below:

Column 30,
Line 4, "1to" should read -- 1 to --; and
Lines 30 to 33,

"  " should be deleted.

Signed and Sealed this

Thirteenth Day of June, 2006

JON W. DUDAS
*Director of the United States Patent and Trademark Office*